(12) United States Patent
Srinivasan

(10) Patent No.: US 7,076,777 B2
(45) Date of Patent: Jul. 11, 2006

(54) RUN-TIME PARALLELIZATION OF LOOPS IN COMPUTER PROGRAMS WITH STATIC IRREGULAR MEMORY ACCESS PATTERNS

(75) Inventor: Radhakrishnan Srinivasan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 10/215,431

(22) Filed: Aug. 7, 2002

(65) Prior Publication Data

US 2004/0031026 A1    Feb. 12, 2004

(51) Int. Cl.
G06F 9/45 (2006.01)
(52) U.S. Cl. .................. 717/161; 717/149; 717/151
(58) Field of Classification Search ........ 717/160–161, 717/149, 151
See application file for complete search history.

(56) References Cited

U.S. PATENT DOCUMENTS 5,151,991 A    9/1992    Iwasawa et al.
6,708,331 B1 *    3/2004    Schwartz .................... 717/160

FOREIGN PATENT DOCUMENTS

JP    7244647    9/1995

OTHER PUBLICATIONS

L. Rauchwerger, Run-Time Parallelization: It's Time Has Come, Journal of Parallel Computing, special issue on languages and compilers for parallel computers, vol. 24, pp. 527 to 556 (1998).

T. Huang et al., "An Efficient Run-time Scheme for Exploiting Parallelism on Multiprocessor System," M. Valero, V. K. Prasanna and S. Vajapeyam (eds): HiPC 2000, LNCS 1970, pp. 27-36 (2000).

* cited by examiner

Primary Examiner—Tuan Dam
Assistant Examiner—John Romano
(74) Attorney, Agent, or Firm—Anthony V. S. England; T. Rao Coca

(57) ABSTRACT

Run-time parallelization of loops with static irregular read-write memory access patterns is performed across multiple arrays. More than one element from each array can be read or written during each iteration of the loop.

7 Claims, 2 Drawing Sheets

RUN-TIME PARALLELIZATION OF LOOPS IN COMPUTER PROGRAMS WITH STATIC IRREGULAR MEMORY ACCESS PATTERNS

FIELD OF THE INVENTION

The present invention relates to run-time parallelization of loops that have static irregular memory access patterns.

BACKGROUND

Run-time parallelization of loops that have irregular read-write memory access patterns is of interest to those working in computer science, given the increasing importance of parallel computing. For a recent overview of run-time parallelization, refer to L Rauchwerger, Run-time parallelization: It's time has come, Journal of Parallel Computing, special issue on languages and compilers for parallel computers, vol 24, pp 527 to 556 (1998).

Irregular loops in computer programs can have static read-write access patterns, which are defined at the beginning of execution by reading an input file (that is, an appropriate data set). Once the data is initially read, the access pattern does not change, but is nevertheless not available at compile-time. As noted in section 1.1 of Rauchwerger, state-of-the-art compilers cannot, in general, analyze and extract parallelism from irregular loops having static memory access patterns at compile-time.

Dynamic memory access patterns (which are computation dependent and are modified from one execution phase to another) require speculative parallelization and are not considered herein.

One recent reference relating to parallelism is T C Huang, P H Hsu and C F Wu, An efficient run-time scheme for exploiting parallelism on multiprocessor systems, in M Valero, V K Prasanna, and S Vajapeyam (eds): HiPC 2000, Lecture Notes in Computer Science, Vol 1970, pp 27–36 (2000), Springer-Verlag (Proceedings of the 7th International Conference on High Performance Computing, Bangalore, India, December 2000). The content of this reference is hereby incorporated by cross-reference.

Huang et al propose an efficient inspector/scheduler/executor algorithm for parallelizing irregular loops using a single array that has a single array element read or written during each pass through the loop. Each such "pass through" is referred to herein as an "iteration". The memory access pattern, in the algorithm proposed by Huang et al, is statically defined.

SUMMARY

Two efficient algorithms are described herein for run-time parallelization of loops with static irregular read-write memory access patterns across multiple arrays. More than one element from each array can be read or written during each iteration of the loop.

The two proposed algorithms are of the inspector/scheduler/executor type.

Loop variables v (v=1 . . . nv) of a loop that has iterations i (i=1 . . . niter) are first determined, and a loop variable array $x_v(ae)$ (ae=1 . . . na(v)) is defined for each of said loop variables v. The loop variables v are read from and written to a data file that maintains values of said loop variables v. For each loop iteration i, (i) a read variable set R(i) has as members elements of the loop variable arrays $x_v(ae)$ that are read, for iteration i, from the data file, and (ii) a write variable set W(i) has as members elements of the loop variable arrays $x_v(ae)$ that are written, for iteration i, to the data file.

For each iteration i, a predecessor iteration j (j=prd(i)) is determined as the maximum iteration for which the intersection of the read variable set R(i) for iteration i and the write variable set W(j) for predecessor iteration j is not a null set Ø. A last write access array lwa(p, v, ae) is determined. The last write access array represents the most recent iteration performed on processor p that writes array element ae of variable v. The predecessor function prd(i) is found by maximising said last write access array lwa(p, v, r(v, ae, i)) over all variables v and all array elements ae of respective variables v.

Each of said iterations i that do not have a predecessor iteration j are assigned to a first wavefront (wf(i)=1), each of said iterations i that do have a predecessor iteration j are assigned to a successive wavefront (wf(i)>1).

Once iterations are so scheduled, each of the wavefronts can be executed in sequence. The iterations in each of the wavefronts are executed in parallel with each other.

A theorem that relates the wavefront schedules and critical path lengths of these two algorithms is proven. The two algorithms are described with particular examples that illustrate the relative merits of the respective algorithms.

DETAILED DESCRIPTION

Figure 1:
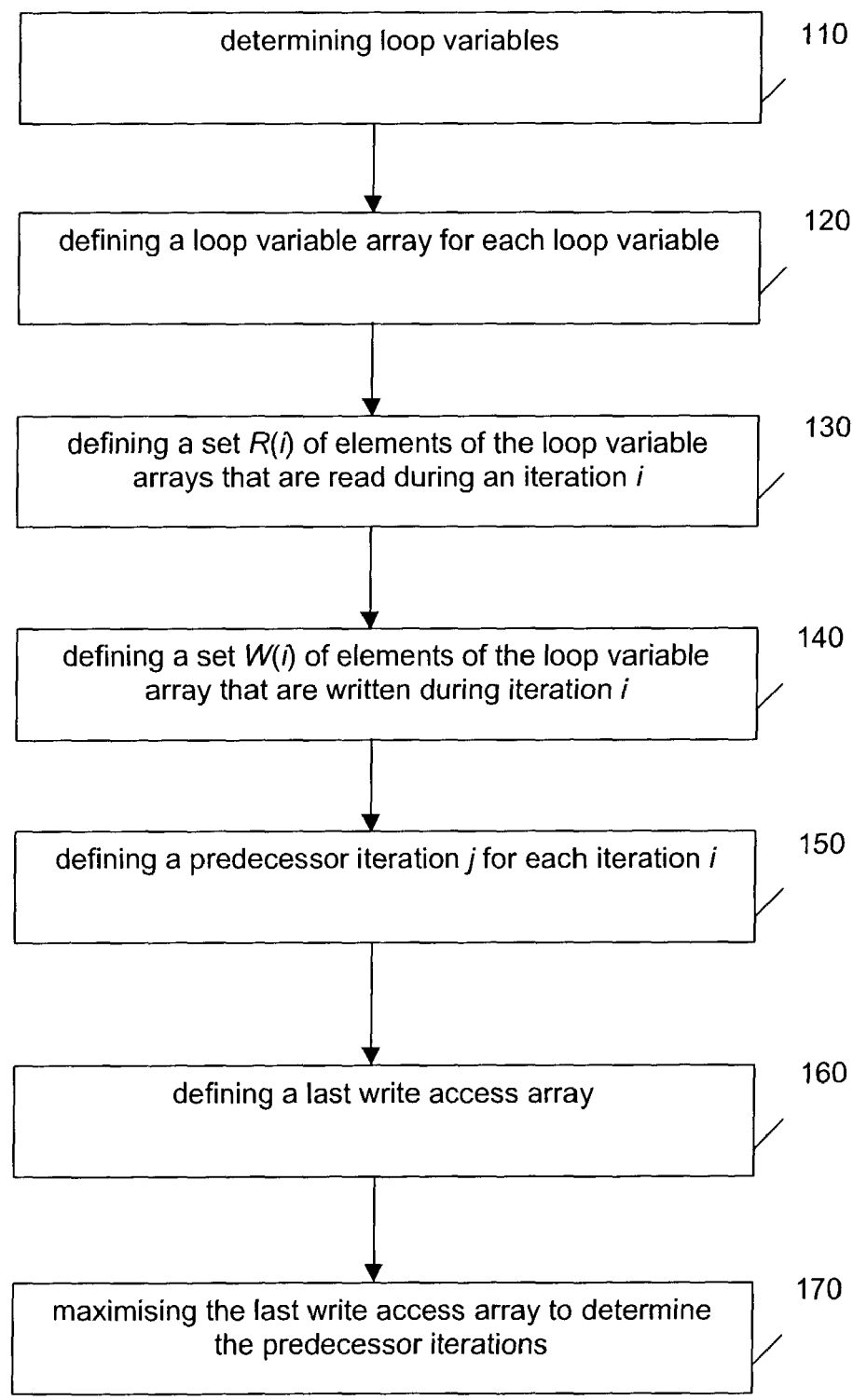
FIG. 1 is a flow chart that represents an algorithm for run-time parallelization of loops of computer programs that have static irregular memory access patterns.

A target loop to be parallelized is defined according to the following notation. Loop iterations are denoted by the index i=1, . . . niter and loop variables by the index v=1, . . . nv. Each of these loop variables is recorded in the single array $x_v(ae)$, where the elements of the array are denoted by the index ae=1, . . . na(v). Note that na(v) is the number of array elements for loop variable v.

Set R(i) consists of array elements from loop variables that are read from a user-supplied data file (referred to as access.dat) during loop iteration i. The terms "read" and "write" are used herein with respect to the data file access.dat and not with respect to, for example, computer memory.

As an example, R(i) is the set $\{x_1(1), x_1(4), x_2(3), x_2(5), x_2(8), x_{nv}(na(v))\}$ for one particular iteration i. Similarly, the set W(i) consists of array elements from loop variables that are updated and written to the same user-supplied data file, access.dat during iteration loop i. The intersection set R(i) ∩ W(i) need not be empty. That is, some loop variables may be read as well as written during a particular loop iteration, i.

An array element of a particular loop variable can be read from access.dat, updated and then over-written in access.dat during loop iteration i. Consequently, only the updated value of a given array element of a given variable is available for use in subsequent loop iterations.

An assumption is made that, during iteration i, the variables v are accessed as follows. All and only those elements of W(i) are updated and written using, as input, all and only those elements of R(i). In summary, the target loop has the structure indicated in Table 1.

TABLE 1

```
do i=1, niter
    read R(i) from access.dat
    ∀x (if (x ∈ W(i)) then x=f_ix(R(i)))
    write W(i) to access.dat
end do
```

Note that $f_\alpha$ is an arbitrary function (indexed by the iteration i and the array element x) of all or some of the elements of R(i). An assumption is made that every element of R(i) is present as an argument of an arbitrary function $f_\alpha$ for a given iteration i. Data that is superfluous can be eliminated prior to parallelization.

Two algorithms for run-time parallelization of loops, algorithm I and algorithm II, are described in turn with reference to the above notation. A comparison of these two algorithms is given, together with examples that illustrate preferred use of one of these two algorithms.

Algorithm I

During any phase of execution, the access.dat file contains the current data for all the array elements of all the loop variables. Before the first iteration, access.dat contains the input data. The sets R(i) and W(i) are specified, for any particular iteration i, by reference to the arrays r and w indicated in Table 2.

TABLE 2

| ∀v∀ae∀i[r(v, ae, i) = ae, | (if $x_v$(ae) is read during iteration i), |
|---|---|
| = 0], | (otherwise), |
| and similarly, | |
| ∀v∀ae∀i[w(v, ae, i) = ae, | (if $x_v$(ae) is written during iteration i), |
| = 0], | (otherwise). |

With reference to Table 2, R(i) and W(i) represent respective sets of all array elements of all variables that are read or written during iteration i. That is, R(i) consists of all and only those array elements for which r(v, ae, i)=ae. Similarly, W(i) consists of all and only those array elements for which w(v, ae, i)=ae. As an example, consider the single variable v specified as the array x(1:4). Suppose only x(1) and x(3) are read and x(2) and x(4) are written during iteration i. Then the arrays r and w are specified by the user as follows:

$r(1, 1, i)=1, r(1, 3, i)=3, r(1, 2, i)=r(1, 4, i)=0, w(1, 1, i)=w(1, 3, i)=0, w(1, 2, i)=2$ and $w(1, 4, i)=4$ The sets R and W in this case are R(i)={x(1), x(3)} and W(i)={x(2), x(4)}.

Let Ø be the empty (that is, null) set, and let I denote the set of iterations {1, . . . niter}. Define prd(i), the predecessor of iteration i, as the maximum iteration j such that (j∈I & j<i & R(i)∩W(j)≠Ø), if this maximum exists. Otherwise, define prd(i)=0. That is, prd(i) is the last iteration j for which the intersection of sets R(i) and W(j) is non-zero.

The algorithm of the inspector, provided in Table 3, constructs the array prd(i) in parallel. In this case, nproc (which is assumed to be less than or equal to niter) is the number of processors available. Contiguous iterations are distributed evenly across the processors. The auxiliary array lwa(1:nproc, 1:nv, 0:na(v)), which is intitialized to zero, is defined such that lwa(p, v, ae), is the latest iteration performed on processor p that writes array element ae of variable v. By definition, lwa(p, v, 0)=0. The function name lwa( ) stands for "latest write access".

TABLE 3

```
/* Construction of the predecessor iteration array prd(i) */
/* Initialize */
prd(1:niter)=0
lwa(1:nproc, 1:nv, 0:na(v))=0
/* Parallel recording phase */
doall p = 1, nproc
    ipmin = (p-1)*(niter/nproc) + 1
    ipmax = p*(niter/nproc)
    do i = ipmin, ipmax
        do v = 1, nv
            do ae = 1, na(v)
                if(lwa(p, v, r(v, ae, i)) .gt. prd(i)) then prd(i) = lwa
                    (p, v, r(v, ae, i))
            enddo
        enddo
        do v = 1, nv
            do ae = 1, na(v)
                lwa(p, v, w(v, ae, i)) = i*w(v, ae, i)/ae
            enddo
        enddo
    enddo
enddoall
/* Parallel patching phase */
doall p = 2, nproc
    ipmin = (p-1)*(niter/nproc) + 1
    ipmax = p*(niter/nproc)
    do i = ipmin, ipmax
        if (prd(i) .eq. 0) then
            do j = p-1, 1, -1
                do v = 1, nv
                    do ae = 1, na(v)
                        if(lwa(j, v, r(v, ae, i)) .gt. prd(i)) then prd(i) = lwa
                            (j, v, r(v, ae, i))
                    enddo
                enddo
                if (prd(i) .gt. 0) go to S1
            enddo
S1:     endif
    enddo
enddoall
```

Detailed explanations for the parallel recording phase and parallel patching phase are provided in an example in section 3.3 of Huang et al, and are, consequently, not repeated here. The main difference in the algorithm of Table 3 with that provided in Huang et al is that only the latest write access of an element of R(i) is considered in the algorithm described herein. In Huang et al, both read and write accesses of an element of both R(i) and W(i) are considered. This difference is further described herein with reference to Algorithm II.

Further, there are multiple variables with possibly a multiple number of array elements read from each variable during each iteration Algorithm I. Accordingly, prd(i) can be found by maximizing lwa(p, v, r(v, ae, i)) over all variables v and all array elements ae of v. This expression, lwa(p, v, r(v, ae, i)), represents the latest write access of array element ae of variable v if the array element ae is read in the current iteration i.

Once this maximum is found, the maximum is set equal to prd(i) and then the array lwa is updated for the latest write access through the step lwa(p, v, w(v, ae, i))=i*w(v, ae, i)/ae.

The right hand side is either i (if array element ae of variable v is written in the current iteration i) or zero (otherwise). In the parallel recording phase, for processors p≧2, prd(i)=0 only implies that iteration i does not contain any predecessor in the range of iterations [ipmin, ipmax] (where ipmin and ipmax are defined in Table 3). Therefore in the parallel patching phase, the correct value of prd(i) for these iterations is found by systematically considering the processors j<p for the latest write access.

After the predecessor iteration array prd(i) is constructed, the wavefronts are scheduled. An array wf(1:niter) is initialized to zero. The elements of this array wf(1:niter) represent the wavefronts in which various iterations i (where i=1:niter) are scheduled. All iterations i that do not have a predecessor iteration j (that is, for which prd(i)=0) are scheduled in the first wavefront. That is, wf(i)=1 for all these iterations that do not have a predecessor. The second wavefront consists of those iterations whose predecessors are scheduled in the first wavefront (that is, those iterations whose predecessors have predecessor zero).

Scheduling continues until all iterations are scheduled. The wavefronts are then sequentially executed, with each wavefront executed in parallel. There is, however, a synchronization requirement within each wavefront. This is described in detail after the algorithm of the parallel scheduler is presented in Table 4.

TABLE 4

```
/* Schedule iterations into wavefronts in parallel */
/* Initialize */
wf(1:niter) = 0
wf(0) = 1
done = .false.
wfnum = 0
/* Repeated until all iterations are scheduled */
do while (done .eq. .false.)
    done = .true.
    wfnum = wfnum+1
        doall p = 1, nproc
            ipmin = (p-1)*(niter/nproc) + 1
            ipmax = p*(niter/nproc)
            do i = ipmin, ipmax
                if (wf(i) .eq. 0) then
                    if (wf(prd(i)) .ne. 0) then
                        wf(i) = wfnum
                    else
                        done = .false.
                    endif
                endif
            enddo
        enddoall
enddo
```

Comparison of Synchronization and Memory Overheads for Algorithm I and Algorithm II An important difference between Algorithm I and Algorithm II is that each wavefront in Algorithm I is not fully parallel. Let the number of wavefronts be denoted by cpl, the criticalpath length. Define $$WF(j)=\{i \in I: wf(i)=j\}, \text{ where } j=1, \ldots cpl$$

Note that WF(j) is the set of all iterations in wavefront j. Sort the iterations in WF(j) in increasing order.

$$WF(j) \{i_1, i_2, \ldots i_m\}, \text{ where } i_1 < i_2 < \ldots < i_m$$

Sorting can be done efficiently in most compilers (for example, Fortran or C compliers). Consider some $i_k$, where $1 < k \leq m$. Construction of prd(i) and the wavefront schedule wf(i) ensures that $R(i_k) \cap W(i_n) = \emptyset$ for all $1 \leq n < k$. All iterations that do not satisfy this condition are already scheduled in a previous wavefront. However, one possibility is that $R(i_k) \cap W(i_n) \neq \emptyset$ for $n \geq k \geq 1$ and (in particular for n>k). This relationship implies that for those array elements in this non-empty intersection, one must ensure that they are read in iteration $i_k$ before they are updated in any iteration $i_n > i_k$.

A second synchronization requirement follows from the observation that one could have $W(i_k) \cap W(i_n) \neq \emptyset$ for any n<k. To guarantee that the correct updated values of the array elements in this non-empty intersection are available to subsequent wavefronts, one must ensure that the execution of the write operation for these array elements in iteration in precedes the corresponding execution for iteration $i_k$.

In practice, since these intersections are expensive to compute, both of the above synchronizations that maintain the semantics of the fully sequential loop can be implemented by ensuring that all the write operations in any wavefront WF(j) are executed in ascending order of the iterations; that is, $W(i_n)$ is written prior to $W(i_k)$ for n<k.

In other words, all write operations within any wavefront are executed in fully sequential order. This means that if, for example, $W(i_k)$ is computed prior to $W(i_n)$ for n<k, then $W(i_k)$ is held in a temporary storage area while waiting for $W(i_n)$ to be written. This increases the storage requirements of the algorithm.

Despite apparently expensive synchronization and storage requirements, Algorithm I is preferred to Algorithm II in many (but not all) instances, as illustrated by further examples described herein. In particular, if the function evaluations within the loop are costly in terms of computation time, but if memory requirements are not a constraint (as may be expected with modem processors), then Algorithm I is preferred.

An example that illustrates the synchronization requirement is as follows. Suppose WF(1) has the iterations 1, 2, 3, 4 and two processors P1 and P2 are available. Then processor P1 handles the iterations {1, 3} in sequence, while processor P2 also handles {2, 4} sequentially. The synchronization requirement mentioned above ensures that the write operations occur in the following order:

1. write W(1)
2. write W(2)
3. write W(3)
4. write W(4)

If, for example, W(4) is computed before W(3) and W(1), then the result is held in temporary storage before being written to access.dat. Similarly, if W(2) is computed before W(1), the result is also held in temporary storage.

Algorithm II

For any iteration i, define the predecessor pr(i) as the maximum iteration j such that (j∈I & j<i & R(i)∩(W(j)∪R(j))≠∅), if this maximum exists. Otherwise, define pr(i)=0.

Similarly, define the predecessor pw(i) as the maximum iteration j such that (j∈I & j<i & W(i)∩(w(j)∪R(j))≠∅), if this maximum exists. Otherwise, define pw(i)=0. For a single variable with a single array element read and written in each iteration, this definition of pr and pw is identical to that used in Huang et al.

The wavefront schedule wf(i) is constructed in an identical manner to that described in Huang et al. Those iterations i for which pr(i)=pw(i)=0 have wf(i)=1. (that is, these iterations are scheduled in the first wavefront). The next (second) wavefront consists of those iterations whose predecessors pr and pw are individually either zero, or are already scheduled in a prior wavefront, etc.

The algorithm of the parallel inspector is indicated in Table 5. An auxiliary array la(1:nproc, 1:nv, 0:na(v)) is initialized to zero and la(p, v, ae) (which is used as an acronym for "latest access") is the latest iteration carried out on processor p that has either read or written array element ae of variable v. By definition, la(p, v, 0)=0.

TABLE 5

```
/* Construction of the predecessor iteration arrays pr(i) and pw(i) */
/* Initialize */
pr(1:niter)=0
pw(1:niter)=0
la(1:nproc, 1:nv, 0:na(v))=0
/* Parallel recording phase */
doall p = 1, nproc
    ipmin = (p-1)*(niter/nproc) + 1
    ipmax = p*(niter/nproc)
        do i = ipmin, ipmax
            do v = 1, nv
                do ae = 1, na(v)
                    if(la(p, v, r(v, ae, i)) .gt. pr(i)) then pr(i) =
                        la (p, v, r(v, ae, i))
                    if(la(p, v, w(v, ae, i)) .gt. pw(i)) then pw(i) =
                        la (p, v, w(v, ae, i))
                enddo
            enddo
            do v = 1, nv
                do ae = 1, na(v)
                    la(p, v, r(v, ae, i)) = i*r(v, ae, i)/ae
                    la(p, v, w(v, ae, i)) = i*w(v, ae, i)/ae
                enddo
            enddo
        enddo
enddoall
/* Parallel patching phase */
doall p = 2, nproc
    ipmin = (p-1)*(niter/nproc) + 1
    ipmax = p*(niter/nproc)
        do i = ipmin, ipmax
            if (pr(i) .eq. 0) then
                do j = p-1, 1, -1
                    do v = 1, nv
                        do ae = 1, na(v)
                            if (la(j, v, r(v, ae, i)) .gt. pr(i)) then pr(i) = la
                                (j, v, r(v, ae, i))
                        enddo
                    enddo
                    if (pr(i) .gt. 0) go to S1
                enddo
S1:         endif
            if (pw(i) .eq. 0) then
                do j = p-1, 1, -1
                    do v = 1, nv
                        do ae = 1, na(v)
                            if (la(j, v, w(v, ae, i)) .gt. pw(i)) then pw(i) =
                                la (j, v, w(v, ae, i))
                        enddo
                    enddo
                    if (pw(i) .gt. 0) go to S2
                enddo
S2:         endif
        enddo
enddoall
```

One merely replaces the line "if (wf(prd(i)).ne. 0) then" in Table 4 by "if (wf(pr(i)).ne.0.and.wf(pw(i)).ne.0) then", to obtain the desired algorithm for the parallel scheduler.

In contrast to Algorithm I, iterations within each wavefront of Algorithm II can be executed fully in parallel. There is no synchronization requirement. However, Algorithm II may not extract a sufficient degree of "parallelism" in all cases, due to the conservative strategy used in constructing the predecessor arrays. A simple example is given below in which Algorithm II "fails" (that is, is fully sequential). By contrast, Algorithm I executes the iterations fully in parallel, with only the write operations executed sequentially.

Theorems

Theorem I. For a given memory access pattern, $\forall i \in I$ [$prd(i) \leq pr(i)$].

The proof is elementary and follows from the definitions. One obtains a contradiction by assuming $pr(i)<prd(i)$.

Definition. For j, $k \in I$ and any positive integer m, define j as the m-predecessor of k, that is, $j={}^m pr(k)$, if and only if $j=pr(pr( \ldots (pr(k)) \ldots )$, where pr is nested m times in the above expression. For example, the 2-predecessor of k is pr(pr(k)), while the 1-predecessor of k is pr(k). Let $wf_2(k)$ be the wavefront that executes k in Algorithm II. Accordingly, the following expression applies:

$$wf_2(k) - wf_2({}^m pr(k)) \geq m$$

Note that in Algorithm II, the 1-predecessor of a given iteration k is scheduled at least one wavefront prior to that in which k is scheduled and the 2-predecessor is scheduled at least two wavefronts earlier, and so on. Proofs for Theorem 2 and Theorem 3 stated below are deferred to the ensuing section.

Theorem 2. For a given memory access pattern, suppose that for some $k \in I$, $0 < prd(k) \neq pr(k)$. Then $\exists m \geq 1 [prd(k) = {}^m pr(pr(k))]$.

Theorem 2 implies that if $prd(k) \neq pr(k)$ and if pr(k) is scheduled in a given wavefront of Algorithm II, then prd(k) is scheduled in a prior wavefront.

In Theorem 3 below, the subscripts 1 and 2 indicate that the corresponding entities are those of Algorithms I and II respectively.

Theorem 3. For a given memory access pattern, the following must hold:

$$\forall j \left[ 1 \leq j \leq \min(cpl_1, cpl_2) \Rightarrow \bigcup_{i=1}^{j} WF_2(i) \subseteq \bigcup_{i=1}^{j} WF_1(i) \right]$$

Equivalently, $\forall i \in I$ [$wf_2(i) \geq wf_1(i)$]. Accordingly, $cpl_1 \leq cpl_2$.

What Theorem 3 asserts is that if a given iteration is assigned to some wavefront in Algorithm II, then the iteration is assigned to either the same wavefront or some prior wavefront in Algorithm I. Hence, as a simple corollary, the critical path length of Algorithm I is always less than or equal to the critical path length of Algorithm II. Even if the critical path lengths of the two algorithms are the same for a given access pattern, Algorithm I, in general, has more iterations scheduled in the initial wavefronts than Algorithm II. Therefore, the synchronization burden in Algorithm I is at a peak in initial wavefronts, and decreases in later wavefronts. Some elementary examples that illustrate these theorems and the relative merits of Algorithms I and II are described herein.

Examples of relative merits of Algorithm I and Algorithm II.

EXAMPLE 1

Consider the case of a single variable x(1:2) with x(1) read and x(2) written during each iteration. Algorithm I assigns all the iterations to a single wavefront (since prd(i) =0 for all iterations i), with the execution of the writes occurring in a sequential manner.

Thus, Algorithm I executes the loop (barring the writes) fully in parallel. However, in Algorithm II, one obtains $\forall i \in I$ [$pr(i)=pw(i)=i-1$], which implies that there are as many wavefronts as there are iterations. That is, execution is fully sequential. If the function evaluated in each iteration of the loop, namely $x(2)=f(x(1))$, is expensive in terms of computer time, Algorithm I, which executes these function evaluations fully in parallel, is advantageous compared to Algorithm II. Thus, Algorithm II essentially "fails". Accordingly, Algorithm I is preferred for this example, provided that memory is not a constraint.

EXAMPLE 2

Consider the example of a single variable x(1:8), with niter=12 and the memory access pattern described in Huang et al. This memory access pattern is identified by the arrays r(1:niter) and w(1:niter) with x(r(i)) read from and x(w(i)) written to access.dat during each iteration. The access pattern and the predecessor arrays and wavefront schedules $wf_1$ and $wf_2$ are illustrated in Table 6.

TABLE 6

| i | r(i) | w(i) | prd(i) | pr(i) | pw(i) | $wf_1(i)$ | $wf_2(i)$ |
|---|------|------|--------|-------|-------|-----------|-----------|
| 1 | 5 | 3 | 0 | 0 | 0 | 1 | 1 |
| 2 | 6 | 4 | 0 | 0 | 0 | 1 | 1 |
| 3 | 1 | 1 | 0 | 0 | 0 | 1 | 1 |
| 4 | 3 | 1 | 1 | 1 | 3 | 2 | 2 |
| 5 | 7 | 5 | 0 | 0 | 1 | 1 | 2 |
| 6 | 2 | 2 | 0 | 0 | 0 | 1 | 1 |
| 7 | 4 | 8 | 2 | 2 | 0 | 2 | 2 |
| 8 | 3 | 1 | 1 | 4 | 4 | 2 | 3 |
| 9 | 8 | 8 | 7 | 7 | 7 | 3 | 3 |
| 10 | 7 | 5 | 0 | 5 | 5 | 1 | 3 |
| 11 | 8 | 7 | 9 | 9 | 10 | 4 | 4 |
| 12 | 1 | 2 | 8 | 8 | 6 | 3 | 4 |

With reference to Table 6, the three theorems are satisfied. Note that $cpl_1 = cpl_2 = 4$. The only advantage that Algorithm I provides in this instance is that the first wavefront is packed with more iterations, and there are fewer iterations in the third and fourth wavefronts. Thus, as the execution proceeds, more processors become available to take care of synchronization and memory overheads. This advantage is not (subjectively) considered sufficient to overcome the fact that the critical path lengths are identical, as Algorithm II has no synchronization or memory overheads. Thus, Algorithm II is preferred in this case.

EXAMPLE 3

Consider example 2 with r(11)=7 instead of r(11)=8. The corresponding results are rated in Table 7.

TABLE 7

| i | r(i) | w(i) | prd(i) | pr(i) | pw(i) | $wf_1(i)$ | $wf_2(i)$ |
|---|------|------|--------|-------|-------|-----------|-----------|
| 1 | 5 | 3 | 0 | 0 | 0 | 1 | 1 |
| 2 | 6 | 4 | 0 | 0 | 0 | 1 | 1 |
| 3 | 1 | 1 | 0 | 0 | 0 | 1 | 1 |
| 4 | 3 | 1 | 1 | 1 | 3 | 2 | 2 |
| 5 | 7 | 5 | 0 | 0 | 1 | 1 | 2 |
| 6 | 2 | 2 | 0 | 0 | 0 | 1 | 1 |
| 7 | 4 | 8 | 2 | 2 | 0 | 2 | 2 |
| 8 | 3 | 1 | 1 | 4 | 4 | 2 | 3 |
| 9 | 8 | 8 | 7 | 7 | 7 | 3 | 3 |
| 10 | 7 | 5 | 0 | 5 | 5 | 1 | 3 |
| 11 | 7 | 7 | 0 | 10 | 10 | 1 | 4 |
| 12 | 1 | 2 | 8 | 8 | 6 | 3 | 4 |

Note that $cpl_1=3$ and $cpl_2=4$, and once again the three theorems can be verified with reference to Table 7. Algorithm I extracts more parallelism than Algorithm II. If the function evaluations during each iteration are expensive in terms of computer time, then Algorithm I executes substantially faster, and is accordingly preferred, despite the synchronization requirement. Theoretically, if enough processors are available, Algorithm I can execute in 75% of the time that Algorithm II takes to execute, but the synchronization requirement probably makes this percentage slightly larger.

The three examples considered herein are for a single variable, in which a single array element read or written during each iteration. When there are multiple variables with more than one array element read or written during each iteration with, for example, the access patterns generated randomly, Algorithm I is likely to yield a substantial reduction in the critical path length as compared to Algorithm II. Hence, in almost all such instances, Algorithm I is preferred.

Proofs of Theorem 2 and Theorem 3

Proof of Theorem 2

By Theorem 1, prd(k)<pr(k). Consider the set S defined by the following expression:

$$S=\{j \in I: prd(k) \leq j < k \,\&\, R(k) \cap R(j) \neq \emptyset \,\&\, R(k) \cap W(j) = \emptyset\}$$

As a result, $S \neq \emptyset$, since $pr(k) \in S$ (by the hypothesis of the theorem and the definitions of pr and prd, pr(k) satisfies the above defined property for S-membership). Further, S is bounded (above) by k and (below) by prd(k).

Any non-empty bounded set of positive integers contains a minimum and a maximum. Therefore, S contains a minimum and a maximum. The maximum is pr(k) and the minimum member n satisfies pr(n)=prd(k).

Suppose S contains a single member. This member is pr(k) and, consequently, prd(k)=pr(pr(k)). That is, prd(k) $=^1$pr(pr(k)). Suppose S contains 2 members, which are pr(k) and pr(pr(k)). Accordingly, prd(k)=$^2$pr(pr(k)). By induction, if S contains m members for any positive integer m, then prd(k)=$^m$pr(pr(k)). Since S is non-empty, the theorem is proved.

Proof of Theorem 3

Theorem 3 is proved by induction. First observe that:

$$\forall i \in I [i \in WF_2(1) \Rightarrow i \in WF_1(1)], \text{ that is } WF_2(1) \subseteq WF_1 \quad (1)$$

This expression is true because the first wavefront $WF_2(1)$ contains those iterations i that satisfy pr(i)=pw(i)=0. But by Theorem 1, prd(i)=0 for all iterations in $WF_2(1)$, which must therefore belong to $WF_1(1)$ as well To complete the proof of theorem 3 by induction, one needs to prove equation (0):

$$\forall m \left[ \left( 1 \leq m < \min(cpl_1, cpl_2) \,\&\, \bigcup_{i=1}^{m} WF_2(i) \subseteq \bigcup_{i=1}^{m} WF_1(i) \right) \Rightarrow \bigcup_{i=1}^{m+1} WF_2(i) \subseteq \bigcup_{i=1}^{m+1} WF_1(i) \right] \quad (0)$$

To obtain a contradiction, suppose the left-hand side of the above implication (the induction hypothesis) is true and the right-hand side is false. Then, there exists some iteration k that satisfies equation (1):

$$k \in WF_2(m+1) \,\&\, k \notin \bigcup_{i=1}^{m+1} WF_1(i) \quad (1)$$

As a result, equation (2) applies:

$$pr(k) \in \bigcup_{i=1}^{m} WF_2(i) \text{ \& } prd(k) \notin \bigcup_{i=1}^{m} WF_1(i) \qquad (2)$$

Equation (2), together with the induction hypothesis, implies equation (3):

$$pr(k) \in \bigcup_{i=1}^{m} WF_2(i) \text{ \& } prd(k) \notin \bigcup_{i=1}^{m} WF_2(i) \qquad (3)$$

Clearly, equation (3) implies that prd(k)>0 and prd(k)≠pr(k). By Theorem 1, 0<prd(k)<pr(k). But then by Theorem 2, one concludes that prd(k)=$^m$pr(pr(k)) for some m≧1. Accordingly, equation (4) applies:

$$pr(k) \in \bigcup_{i=1}^{m} WF_2(i) \Rightarrow prd(k) \in \bigcup_{i=1}^{m} WF_2(i). \qquad (4)$$

Equation (4) contradicts equation (3). From this contradiction, one can conclude that hypothesis (1) is incompatible with the induction hypothesis, from which equation (0) follows. Accordingly, Theorem 3 is proved by induction.

Computer Hardware and Software

Figure 2:
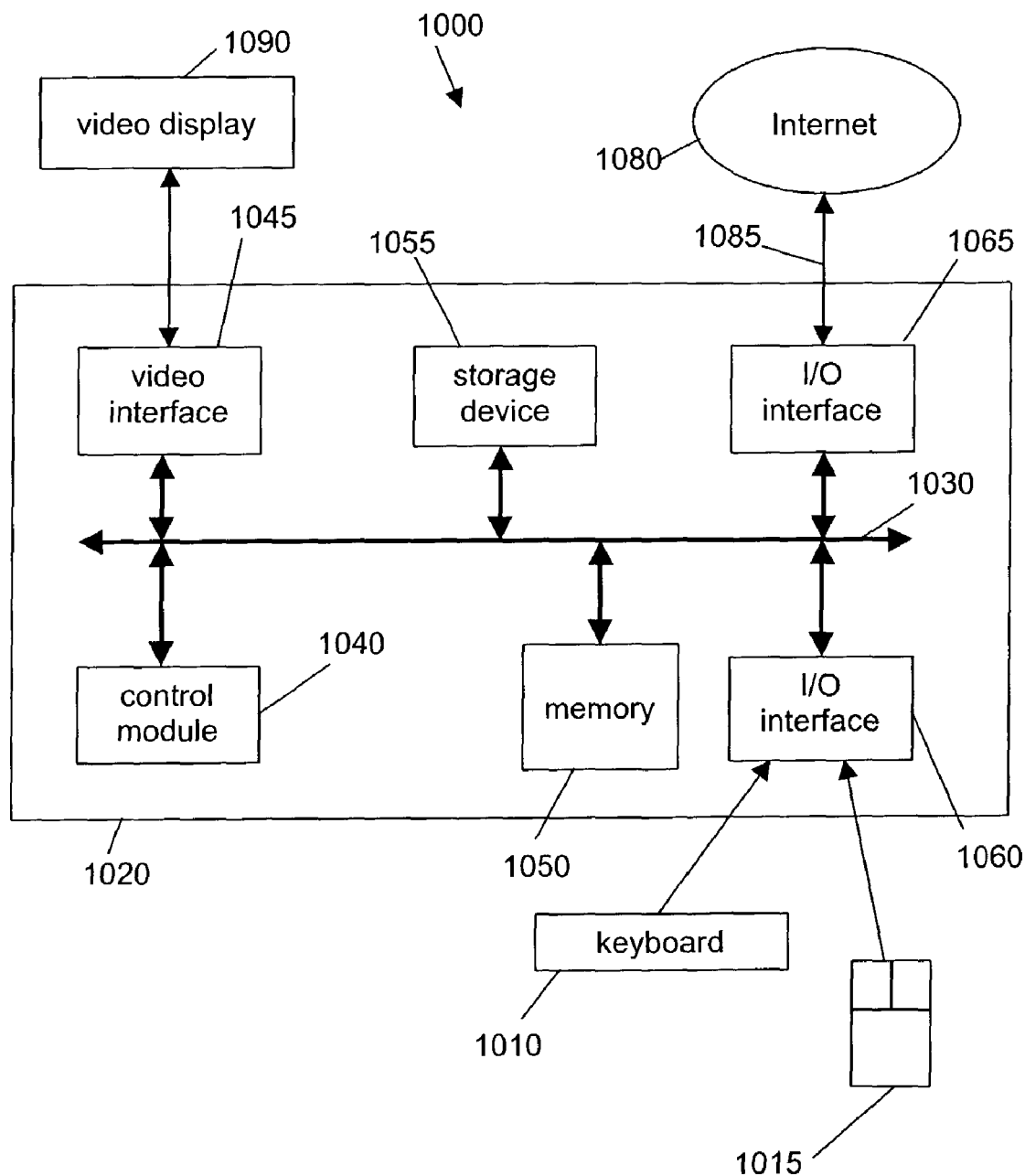
FIG. 2 is a schematic representation of a computer system suitable for performing the techniques described with reference to FIG. 1.

FIG. 2 is a schematic representation of a computer system 200 that can be used to perform steps in a process that implement the techniques described herein. The computer system 200 is provided for executing computer software that is programmed to assist in performing the described techniques. This computer software executes under a suitable operating system installed on the computer system 200.

The computer software involves a set of programmed logic instructions that are able to be interpreted by the computer system 200 for instructing the computer system 200 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 200 include: a computer 220, input devices 210, 215 and video display 270. The computer 1020 includes: processor 240, memory module 250, input/output (P/O) interfaces 260, 265, video interface 245, and storage device 255.

The processor 240 is a central processing unit (CPU) that executes the operating system and the computer software executing under the operating system. The memory module 250 includes random access memory (RAM) and read-only memory (ROM), and is used under direction of the processor 240.

The video interface 245 is connected to video display 290 and provides video signals for display on the video display 270. User input to operate the computer 230 is provided from input devices 210, 215 consisting of keyboard 210 and mouse 215. The storage device 255 can include a disk drive or any other suitable non-volatile storage medium.

Each of the components of the computer 220 is connected to a bus 230 that includes data, address, and control buses, to allow these components to communicate with each other via the bus 230.

The computer system 200 can be connected to one or more other similar computers via a input/output (I/O) interface 265 using a communication channel 285 to a network 280, represented as the Internet.

The computer software program may be provided as a computer program product, and recorded on a portable storage medium. In this case, the computer software program is accessed by the computer system 200 from the storage device 262. Alternatively, the computer software can be accessed directly from the network 280 by the computer 220. In either case, a user can interact with the computer system 200 using the keyboard 210 and mouse 215 to operate the programmed computer software executing on the computer 220.

The computer system 200 is described for illustrative purposes: other configurations or types of computer systems can be equally well used to implement the described techniques. The foregoing is only an example of a particular type of computer system suitable for implementing the described techniques.

Conclusion

A method, computer software, and a computer system are described herein for run-time parallelization of loops in computer programs that have static irregular memory access patterns. Various alterations and modifications can be made to the techniques and arrangements described herein, as would be apparent to one skilled in the relevant art.

I claim:

1. A method in a computer system for scheduling iterations of a loop in a computer program for parallel execution, in which the loop has an irregular memory access pattern involving multiple arrays, the computer program being stored on tangible media of a storage device of the computer system, the method comprising the steps of:

reading the computer program from the storage device by the computer system; and performing steps by the computer system responsive to the instructions of the computer program, the steps including:

reading and writing loop variables v (v=1 . . . nv) of a loop of the computer program that has iterations i (i=1 . . . niter) respectively from and to a data file that maintains values of said loop variables v;

recording, for each of said loop variables v, a respective loop variable array $x_v$(ae) (ae=1 . . . na(v));

calculating, for each loop iteration i, (i) a read variable set R(i) that has as members elements of said loop variable arrays $x_v$(ae) that we read, for iteration i, from said data tile, and (ii) a write variable set W(i) that has as members elements of said loop variable arrays $x_v$(ae) that are written, for iteration i, to said data file, wherein multiple variables with multiple array elements are read from each variable during each iteration;

calculating, for each iteration i, a predecessor iteration j (j=prd(i)) as the maximum iteration for which the intersection of the read variable set R(i) for iteration i and the write variable set W(j) for predecessor iteration j is not a null set Ø;

determining a last write access array lwa(p, v, ae), which represents a most recent iteration performed on processor p that writes array element ae of variable v, such that only a latest write access of such an element of R(i) is considered rather than both read and write accesses of such an element of R(i) and W(i);

assigning in a first wavefront (wf(i)=1) each of said iterations i that do not have a predecessor iteration j, and assigning to a successive wavefront (wf(i)>1) each of said iterations i that do have a predecessor iteration j; and scheduling each of said iterations i into one of said scheduled wavefronts;

wherein iterations in parallelizable loops having arbitrary data access patterns, defined by said recorded loop variable arrays $x_v(ae)$, are inspected and scheduled for execution.

2. The method as claimed in claim 1, further comprising the step of:

executing each of said wavefronts in sequence, and executing each of said iterations in each of said wavefronts in parallel with each other.

3. The method as claimed in claim 1, wherein said predecessor prd(i) is found by maximising a particular instance of said last write access array lwa(p, v, ae) over all variables v and all array elements ae of respective loop variables v, wherein for the particular instance of said last write access array lwa(p, v, ae) for a latest write access of array element ae of variable v the array element ae is read in a current iteration i.

4. An apparatus for scheduling iterations of a loop in a computer program for parallel execution, in which the loop has an irregular memory access pattern involving multiple arrays, the apparatus comprising:

a processor;

a storage device having stored, on a tangible media thereon, a computer program for controlling the processor, wherein the processor is operative to read the computer program from the media and perform steps responsive to instructions of the computer program, wherein the computer program includes:

instructions for reading and writing loop variables v(v=1 . . . nv) of a loop in the computer program that has iterations i (i=1 . . . niter) respectively from and to a data file that maintains values of said loop variables v;

instructions for recording, for each of said loop variables v, a respective loop variable array $x_v(ae)$ (ae=1 . . . na(v));

instructions for calculating, for each loop iteration i, (i) a read variable set R(i) that has as members elements of said loop variable arrays $x_v(ae)$ that are read, for iteration i, from said data file, and (ii) a write variable set W(i) that has as members elements of said loop variable arrays $x_v(ae)$ that are written, for iteration i, to said data file, wherein multiple variables with multiple array elements are read from each variable during each iteration;

instructions for calculating, for each iteration i, a predecessor iteration j (j=prd(i)) as the maximum iteration for which the intersection of the read variable set R(i) for iteration i and the write variable set W(j) for predecessor iteration j is not a null set Ø;

instructions for determining a last write access array lwa(p, v, ae), which represents the most recent iteration performed on processor p that writes array element ae of variable v, such that only a latest write access of such an element of R(i) is considered rather than both read and write accesses of such an element of R(i) and W(i);

instructions for assigning in a first wavefront (wf(i)=1) each of said iterations i tat do not have a predecessor iteration j, and assigning to a successive wavefront (wf(i)>1) each of said iterations i that do have a predecessor iteration j; and instructions for scheduling each of said iterations i into one of said scheduled wavefronts;

wherein iterations in parallelizable loops having arbitrary data access patterns, defined by said recorded loop variable arrays $x_v(ae)$, are inspected and scheduled for execution.

5. The apparatus as claimed in claim 4, wherein said predecessor prd(i) is found by maximising said last write access array lwa(p, v, r(v, ae, i)) over all variables v and all array elements ae of respective loop variables v.

6. A computer program product for scheduling iterations of a loop in a computer program for parallel execution, in which the loop has an irregular memory access pattern involving multiple arrays, wherein the computer program product resides on a tangible computer usable medium having computer readable readable program code, the program code comprising:

instructions for reading and writing loop variables v (v=1 . . . nv) of a loop of the computer program that has iterations i (i=1 . . . niter) respectively from and to a data file that maintains values of said loop variables v;

instructions for recording, for each of said loops variables v, a respective loop variable array $x_v(ae)$ (ae=1 . . . na(v));

instructions for calculating, for each loop iteration i, (i) a read variable set R(i) that has as members elements of said loop variable arrays $x_v(ae)$ that are read, for iteration i, from said data file, and (ii) a write variable set W(i) that has as members elements of said loop variable arrays $x_v(ae)$ that are written, for iteration i, to said data file, wherein multiple variables with multiple array elements are read from each variable during each iteration;

instructions for calculating, for each iteration i, a predecessor iteration j (j=prd(i)) as the maximum iteration for which the intersection of the read variable set R(i) for iteration i and the write variable set W(j) for predecessor iteration j is not a null set Ø;

instructions for determining a last write access array lwa(p, v, ae), which represents the most recent iteration performed on processor p tat writes array element ae of variable v, such that only a latest write access of such an element of R(i) is considered rather than both read and write accesses of such an element of R(i) and W(i);

instructions for assigning in a first wavefront (wf(i)=1) each of said iterations i that do not have a predecessor iteration j, and assigning to a successive wavefront (wf(i)>1) each of said iterations i that do have a predecessor iteration j; and instructions for scheduling each of said iterations i into one of said scheduled wavefronts;

instructions for wherein iterations I parallelizable loops having arbitrary data access patterns, defined by said recorded loop variable arrays $x_v(ae)$, are inspected and scheduled for execution.

7. The computer program product as claimed in claim 6, wherein said predecessor $prd(i)$ is found by maximising said last write access array $lwa(p, v, r(v, ae, s))$ over all variables v and all array elements ae of respective loop variables v.

* * * * *

UNITED STATES PATENT AND TRADEMARK OFFICE
CERTIFICATE OF CORRECTION

PATENT NO. : 7,076,777 B2
APPLICATION NO. : 10/215431
DATED : July 11, 2006
INVENTOR(S) : Radhakrishnan Srinlvasan It is certified that error appears in the above-identified patent and that said Letters Patent is hereby corrected as shown below:

The 10th line of column 3, as the claim is set out in the printed patent, which reads "Note that $f$a is an arbitrary…"

should read

--Note that $f_{ix}$ is an arbitrary…--.

Signed and Sealed this

Twenty-first Day of November, 2006

JON W. DUDAS
*Director of the United States Patent and Trademark Office*